US012210305B2

(12) United States Patent
Suga

(10) Patent No.: US 12,210,305 B2
(45) Date of Patent: Jan. 28, 2025

(54) IMAGE FORMING APPARATUS

(71) Applicant: Tomoaki Suga, Kanagawa (JP)

(72) Inventor: Tomoaki Suga, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/235,887

(22) Filed: Aug. 21, 2023

(65) Prior Publication Data

US 2024/0085836 A1 Mar. 14, 2024

(30) Foreign Application Priority Data

Sep. 14, 2022 (JP) ................................ 2022-146178

(51) Int. Cl.
*G03G 21/16* (2006.01)
*G03G 15/00* (2006.01)

(52) U.S. Cl.
CPC ......... *G03G 15/50* (2013.01); *G03G 21/1647* (2013.01); *G03G 21/168* (2013.01)

(58) Field of Classification Search
CPC .. G03G 15/50; G03G 15/5054; G03G 21/168; G03G 21/1647
See application file for complete search history.

(56) References Cited

U.S. PATENT DOCUMENTS

2006/0120748 A1 6/2006 Takehara et al.
2011/0229243 A1* 9/2011 Shiba ................ G03G 15/0194 400/618
2012/0294645 A1* 11/2012 Shimada ........... G03G 21/1633 399/110
2016/0216647 A1* 7/2016 Yogosawa ................ B08B 6/00
2016/0313693 A1 10/2016 Fujiya et al.
2020/0064765 A1 2/2020 Suga et al.
2020/0133172 A1 4/2020 Konishi et al.
2023/0113719 A1 4/2023 Suga

FOREIGN PATENT DOCUMENTS

JP 2011-141314 A 7/2011
JP 2014-106483 A 6/2014

* cited by examiner

*Primary Examiner* — Thomas S Giampaolo, II
(74) *Attorney, Agent, or Firm* — XSENSUS LLP

(57) ABSTRACT

An image forming apparatus includes a belt unit and a detector unit including a detector that is disposed opposite a tension roller via a belt and a detector support that supports the detector. The detector support includes a first lateral end portion that is disposed at one lateral end of the detector support in an axial direction of the tension roller and is movably attached to an apparatus body. The detector support further includes a second lateral end portion that is disposed at another lateral end of the detector support in the axial direction of the tension roller and is attached to the apparatus body. The first lateral end portion includes an engaging groove that engages a shaft of the tension roller. The engaging groove has a mouth that is disposed at a downstream end of the engaging groove in a detaching direction of the belt unit.

20 Claims, 5 Drawing Sheets

IMAGE FORMING APPARATUS

CROSS-REFERENCE TO RELATED APPLICATION

This patent application is based on and claims priority pursuant to 35 U.S.C. § 119(a) to Japanese Patent Application No. 2022-146178, filed on Sep. 14, 2022, in the Japan Patent Office, the entire disclosure of which is hereby incorporated by reference herein.

BACKGROUND

Technical Field

Embodiments of this disclosure relate to an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses include a belt unit and a detector unit. The belt unit includes a plurality of tension rollers, a belt that is stretched taut across the tension rollers, and a roller support that rotatably supports the tension rollers. The detector unit includes a detector and a detector support. The detector is disposed opposite an opposed roller as one of the tension rollers via the belt. The detector detects a condition of a belt surface of the belt or a condition of a detection object on the belt surface of the belt. The detector support supports the detector.

SUMMARY

This specification describes below an improved image forming apparatus. In one embodiment, the image forming apparatus includes an apparatus body and a belt unit that is attachably detached from the apparatus body in a detaching direction. The belt unit includes a first tension roller that rotates. The first tension roller includes a shaft that is disposed at one lateral end of the first tension roller in an axial direction of the first tension roller. The axial direction is perpendicular to the detaching direction of the belt unit. The belt unit further includes a second tension roller that rotates and a belt that is stretched across the first tension roller and the second tension roller. The image forming apparatus further includes a detector unit that includes a detector that is disposed opposite the first tension roller via the belt. The detector detects one of a condition of a belt surface of the belt and a condition of a detection object on the belt surface of the belt. The detector unit further includes a detector support that supports the detector. The detector support includes a first lateral end portion that is disposed at one lateral end of the detector support in the axial direction of the first tension roller and is movably attached to the apparatus body. The detector support further includes a second lateral end portion that is disposed at another lateral end of the detector support in the axial direction of the first tension roller and is attached to the apparatus body. The first lateral end portion includes an engaging groove that engages the shaft of the first tension roller. The engaging groove has a mouth that is disposed at a downstream end of the engaging groove in the detaching direction of the belt unit.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
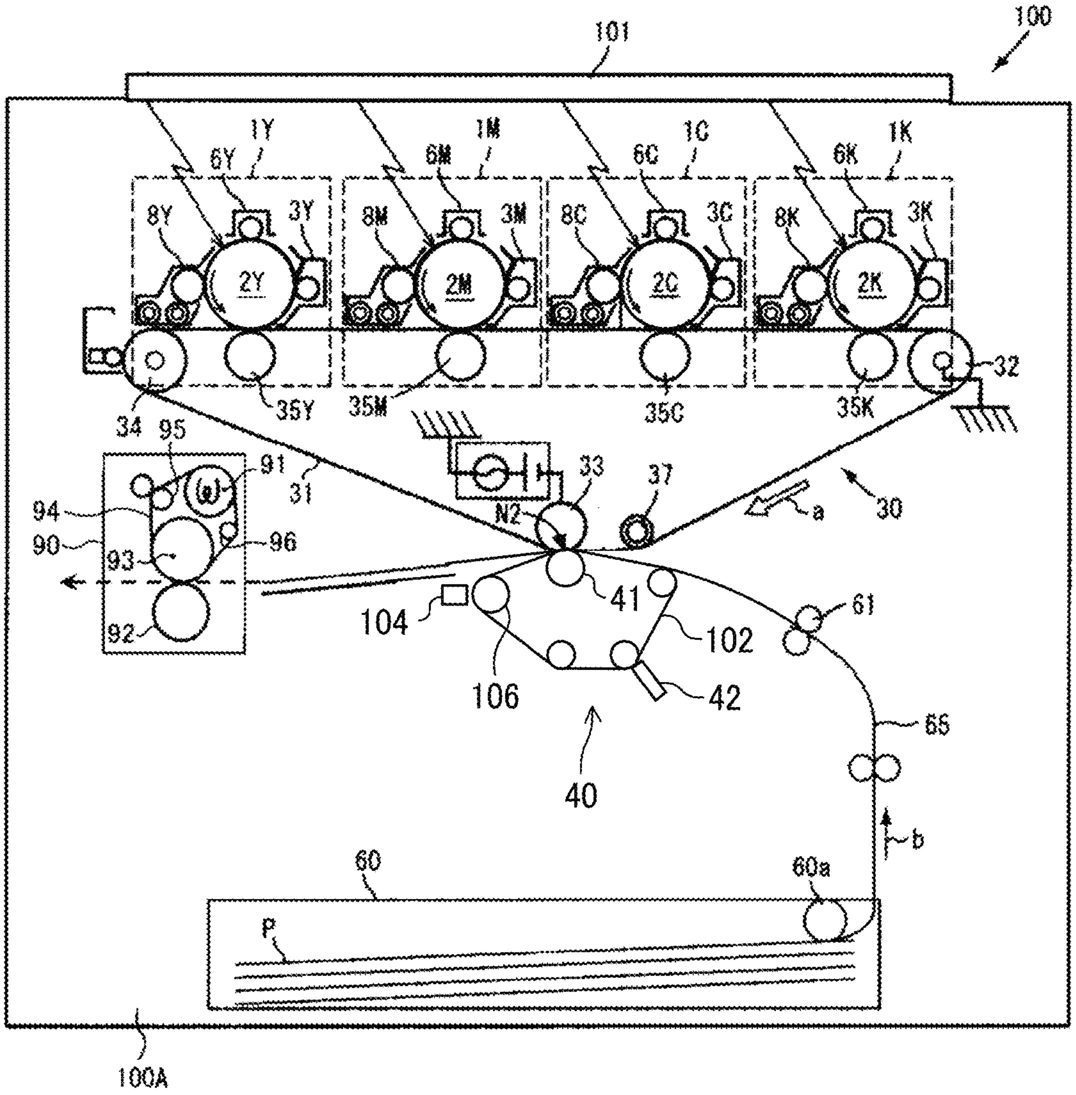
FIG. 1 is a schematic cross-sectional view of an image forming apparatus according to an embodiment of the present disclosure as a color printer employing an electrophotographic method.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to drawings, a description is provided of embodiments of the present disclosure.

FIG. 1 is a schematic cross-sectional view of a printer 100 serving as an image forming apparatus according to an embodiment of the present disclosure, that is, a color printer that forms a color image by electrophotography.

The printer 100 includes four image forming units 1Y, 1M, 1C, and 1K that form toner images in yellow (Y), magenta (M), cyan (C), and black (K), respectively. The printer 100 further includes a transfer unit 30 serving as an intermediate transfer device, a secondary transfer device 40, a sheet tray 60 that loads a plurality of sheets P serving as conveyed objects, recording materials, or recording media, and a fixing device 90.

The four image forming units 1Y, 1M, 1C, and 1K serving as image forming devices use toners in different colors, that is, yellow, magenta, cyan, and black, as powder developers, respectively. Other than usage of the toners in the different colors, the image forming units 1Y, 1M, 1C, and 1K have a common construction. The image forming units 1Y, 1M, 1C, and 1K include drum-shaped photoconductors 2Y, 2M, 2C, and 2K serving as image bearers, drum cleaners 3Y, 3M, 3C, and 3K, dischargers, chargers 6Y, 6M, 6C, and 6K, and developing devices 8Y, 8M. 8C, and 8K, respectively.

The chargers 6Y, 6M, 6C, and 6K uniformly charge surfaces of the photoconductors 2Y, 2M, 2C, and 2K, respectively. The printer 100 further includes an optical writing unit 101 that is disposed above the image forming units 1Y, 1M, 1C, and 1K. The optical writing unit 101 emits exposure light such as laser beams that optically scan and expose the surfaces of the photoconductors 2Y, 2M, 2C, and 2K, forming electrostatic latent images thereon, respectively. The developing devices 8Y, 8M, 8C, and 8K containing yellow, magenta, cyan, and black toners develop the electrostatic latent images into yellow, magenta, cyan, and black toner images, respectively. Thus, the photoconductors 2Y, 2M, 2C, and 2K bear the yellow, magenta, cyan, and black toner images, respectively. The transfer unit 30 includes an intermediate transfer belt 31 serving as an endless belt. The transfer unit 30 primarily transfers the yellow, magenta, cyan, and black toner images formed on the photoconductors 2Y, 2M, 2C, and 2K, respectively, onto an outer circumferential surface (e.g., a front side) of the intermediate transfer belt 31.

The transfer unit 30 serving as the intermediate transfer device is disposed below the image forming units 1Y, 1M, 1C, and 1K. The transfer unit 30 includes the intermediate transfer belt 31 that is the endless belt stretched and rotated clockwise in FIG. 1. According to the embodiment, the outer circumferential surface of the intermediate transfer belt 31 rotates in a rotation direction a.

In addition to the intermediate transfer belt 31, the transfer unit 30 includes a driving roller 32, a secondary transfer backup roller 33 that contacts an inner circumferential surface of the intermediate transfer belt 31, a cleaning backup roller 34, four primary transfer rollers 35Y, 35M, 35C, and 35K, and a transfer upstream roller 37. The intermediate transfer belt 31 is looped over and stretched taut across the driving roller 32, the secondary transfer backup roller 33, the cleaning backup roller 34, the primary transfer rollers 35Y, 35M, 35C, and 35K, and the transfer upstream roller 37 that support the intermediate transfer belt 31. The printer 100 further includes a driver such as a driving motor that drives and rotates the driving roller 32. As the driving roller 32 rotates clockwise in FIG. 1, the driving roller 32 generates a torque that rotates the intermediate transfer belt 31 clockwise in FIG. 1.

The secondary transfer device 40 is disposed outside and below a loop formed by the intermediate transfer belt 31. The secondary transfer device 40 includes a secondary transfer belt 102 that is an endless belt serving as a belt or a transfer belt. The secondary transfer belt 102 is looped over a plurality of tension rollers including a secondary transfer roller 41. The secondary transfer device 40 further includes a cleaner 42 and an opposed roller 106. The cleaner 42 cleans a surface of the secondary transfer belt 102. The printer 100 further includes an adhesion amount detection sensor 104 serving as a detector. The adhesion amount detection sensor 104 is a reflection type optical sensor. The adhesion amount detection sensor 104 is disposed opposite the opposed roller 106 via the secondary transfer belt 102. The opposed roller 106 is one of the tension rollers.

The sheet tray 60 is disposed below the secondary transfer device 40. The sheet tray 60 is a storage that accommodates the plurality of sheets P layered into a sheaf of sheets P. The sheet tray 60 includes a roller 60*a* that contacts an uppermost sheet P of the sheaf of sheets P. The printer 100 further includes a conveyance path 65 and a registration roller pair 61. As the driver drives and rotates the roller 60*a* at a predetermined time, the roller 60*a* feeds the uppermost sheet P from the sheet tray 60 to the conveyance path 65 through which the uppermost sheet P is conveyed to a secondary transfer nip N2 formed between the intermediate transfer belt 31 and the secondary transfer belt 102. The registration roller pair 61 feeds the uppermost sheet P conveyed through the conveyance path 65 to the secondary transfer nip N2 at a time when the yellow, magenta, cyan, and black toner images superimposed on the outer circumferential surface of the intermediate transfer belt 31 reach the secondary transfer nip N2.

The secondary transfer roller 41 secondarily transfers the yellow, magenta, cyan, and black toner images superimposed on the outer circumferential surface of the intermediate transfer belt 31 collectively onto the sheet P at the secondary transfer nip N2 under pressure in a secondary transfer electric field. The yellow, magenta, cyan, and black toner images transferred onto the sheet P form a full color toner image with a background color of white of the sheet P.

The fixing device 90 is disposed downstream from the secondary transfer nip N2 in a sheet conveyance direction b (e.g., a recording medium conveyance direction). The fixing device 90 includes a fixing belt 94 and a plurality of support rollers that supports the fixing belt 94. The support rollers include a heating roller 91, a fixing roller 93, a support roller 96, and a tension roller 95 serving as a tensioner. The fixing device 90 further includes a pressure roller 92 that presses against the fixing roller 93 via the fixing belt 94 to form a fixing nip between the pressure roller 92 and the fixing belt 94. As the sheet P bearing the full color toner image is conveyed through the fixing device 90, the pressure roller 92 and the fixing belt 94 that is contacted by the fixing roller 93 sandwich the sheet P at the fixing nip. As the sheet P receives pressure at the fixing nip and heat conducted from the heating roller 91 accommodating a heater to the fixing belt 94, the pressure roller 92 and the fixing belt 94 melt and fix toner of the full color toner image on the sheet P. The sheet P bearing the fixed full color toner image is ejected from the fixing device 90 onto an outside of the printer 100.

Figure 2:
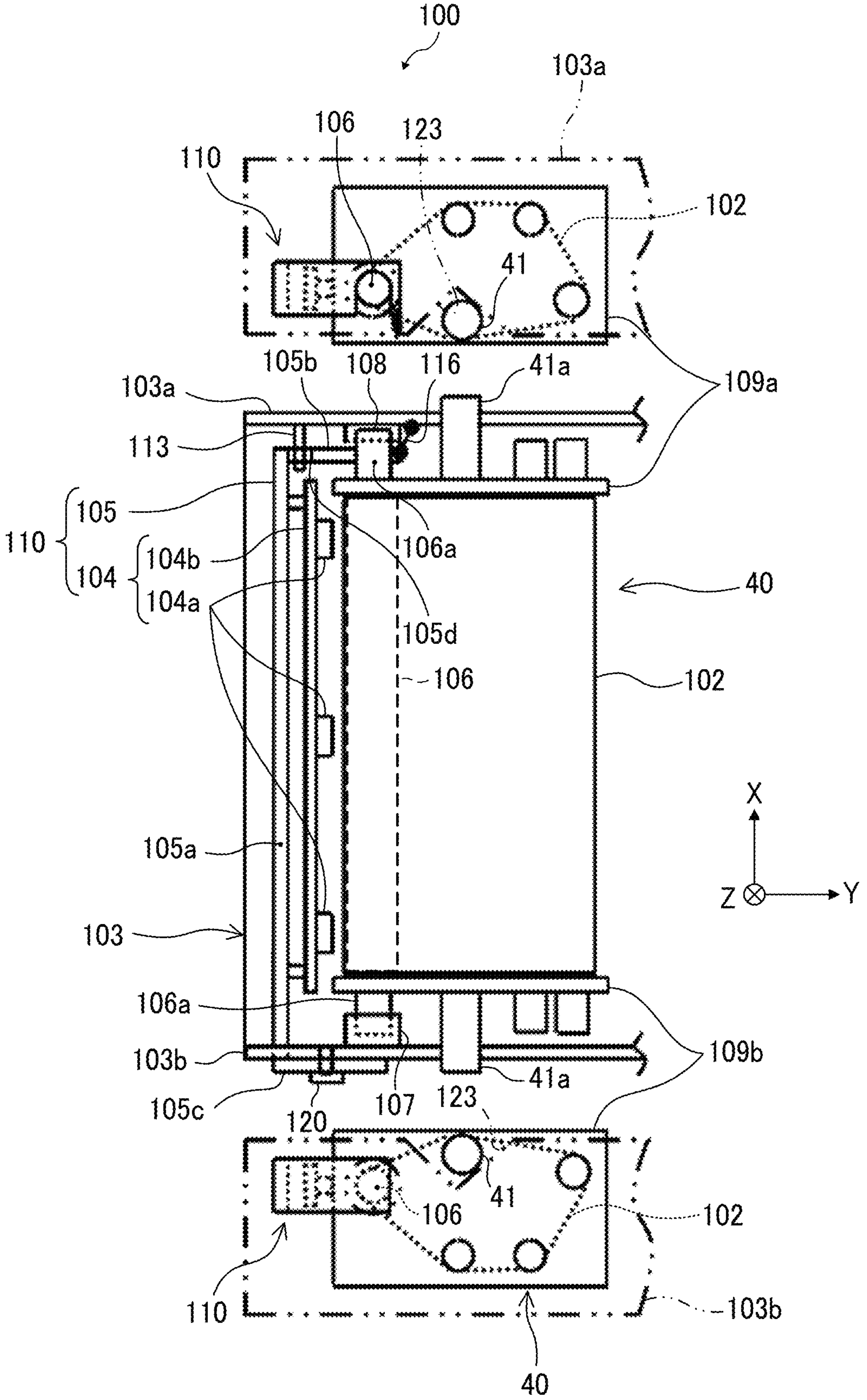
FIG. 2 is a schematic diagram of a secondary transfer device incorporated in the image forming apparatus depicted in FIG. 1.

FIG. 2 is a schematic diagram of the secondary transfer device 40.

In a description below, X-direction defines a belt width direction of the secondary transfer belt 102. Y-direction defines a facing direction in which the adhesion amount detection sensor 104 is disposed opposite the opposed roller 106. Z-direction defines an orthogonal direction perpendicular to X-direction and Y-direction. According to the embodiment, Z-direction defines a vertical direction.

The secondary transfer device 40 serving as a belt unit further includes a pair of roller support plates 109*a* and 109*b*. Each of the roller support plates 109*a* and 109*b* serves as a roller support that rotatably supports the plurality of tension rollers across which the secondary transfer belt 102 is stretched taut. The printer 100 further includes a drawer frame 103 serving as a support frame that supports the secondary transfer device 40. An operator (e.g., a user or a service engineer) draws the drawer frame 103 from an apparatus body 100A of the printer 100 depicted in FIG. 1 in X-direction (e.g., the belt width direction).

The drawer frame 103 includes side plates 103*a* and 103*b* that mount positioners 108 and 107, respectively, that position the secondary transfer device 40. The positioner 108 disposed opposite one lateral end of the secondary transfer device 40 in X-direction is a sub reference for positioning. The positioner 107 disposed opposite another lateral end of the secondary transfer device 40 in X-direction is a main reference for positioning.

The positioner 107, that is disposed opposite another lateral end of the secondary transfer device 40 in X-direction and serves as the main reference for positioning, includes an insertion hole into which a shaft 106*a* of the opposed roller 106, that is disposed at another lateral end of the opposed roller 106 in X-direction, is inserted. The insertion hole has an inner diameter that is slightly greater than an outer diameter of the shaft 106*a* of the opposed roller 106. As the shaft 106*a* disposed at another lateral end of the opposed roller 106 in X-direction is inserted into the insertion hole of the positioner 107 disposed opposite another lateral end of the secondary transfer device 40 in X-direction, the positioner 107 positions another lateral end of the secondary transfer device 40 in Y-direction and Z-direction.

The positioner 108, that is disposed opposite one lateral end of the secondary transfer device 40 in X-direction and serves as the sub reference for positioning, includes a groove having a mouth at an upper portion of the groove in the vertical direction. As one end of the shaft 106*a* of the opposed roller 106 fits into the positioner 108 disposed opposite one lateral end of the secondary transfer device 40 in X-direction, the positioner 108 positions one lateral end of the secondary transfer device 40 in Y-direction.

The printer 100 further includes a support 123 that is mounted on an upper portion of each of the side plates 103*a* and 103*b* of the drawer frame 103 in +Z-direction. The support 123 supports a shaft 41*a* of the secondary transfer roller 41. The drawer frame 103 supports the secondary transfer device 40 through the supports 123 and the positioners 108 and 107 that are disposed opposite one lateral end and another lateral end of the secondary transfer device 40 in the belt width direction, respectively.

The positioner 107 disposed opposite another lateral end of the secondary transfer device 40 in the belt width direction is attached to the side plate 103*b* disposed at another lateral end of the drawer frame 103 in the belt width direction such that the positioner 107 slides in X-direction. As the positioner 107 disposed opposite another lateral end of the secondary transfer device 40 in the belt width direction slides in −X-direction, the positioner 107 releases supporting of the shaft 106*a* of the opposed roller 106, thus releasing positioning of the secondary transfer device 40. Accordingly, the operator detaches the secondary transfer device 40 from the drawer frame 103 and attaches the secondary transfer device 40 to the drawer frame 103 in Z-direction (e.g., the vertical direction).

The printer 100 further includes a sensor unit 110 that is attached to the drawer frame 103. The sensor unit 110 includes the adhesion amount detection sensor 104 serving as the detector and a sensor support 105 serving as a detector support. The adhesion amount detection sensor 104 is disposed opposite the opposed roller 106 via the secondary transfer belt 102. The adhesion amount detection sensor 104 includes detection portions 104*a* and a sensor substrate 104*b*. The detection portions 104*a* are disposed at a center and both lateral ends of the adhesion amount detection sensor 104 in X-direction (e.g., the belt width direction), respectively. The sensor substrate 104*b* mounts the detection portions 104*a*. Each of the detection portions 104*a* includes a light-emitting element and a light-receiving element. The adhesion amount detection sensor 104 is placed inside the apparatus body 100A in a posture in which light emitted from the light-emitting element travels toward a rotation center O1 of the opposed roller 106 depicted in FIG. 3.

Each of the detection portions 104*a* receives reflected light reflected by a detection pattern as a detection object or a toner image that is secondarily transferred from the intermediate transfer belt 31 onto the secondary transfer belt 102. Each of the detection portions 104*a* outputs a voltage corresponding to a toner adhesion amount (e.g., an image density) of toner of the toner image as the detection pattern. The printer 100 further includes a controller that detects the toner adhesion amount (e.g., the image density) of toner of the toner image as the detection pattern based on the voltage output by each of the detection portions 104*a*. The controller adjusts an image formation condition such as an exposure condition based on a detection result sent from each of the detection portions 104*a* so that the printer 100 prints a toner image having a predetermined image density. Thus, according to the embodiment, the secondary transfer belt 102 serves as a toner image bearer that bears the toner image as the detection pattern.

The controller detects skew of the toner image based on differences between times at which the detection portions 104*a* detect the detection pattern. The controller controls a skew correction mechanism incorporated in the optical writing unit 101, thus correcting skew of the toner image.

The sensor support 105 includes a sensor mount 105*a* that extends in X-direction (e.g., the belt width direction) and mounts the adhesion amount detection sensor 104. The sensor support 105 further includes attachments 105*b* and 105*c* (e.g., bearings) that project from both lateral ends of the sensor mount 105*a* in X-direction toward the secondary transfer device 40 in +Y-direction. The attachment 105*c* is disposed below the secondary transfer device 40 in FIG. 2 and disposed opposite another lateral end of the secondary transfer device 40 in the belt width direction. The printer 100 further includes a screw 120 that immovably fastens the attachment 105*c* to the side plate 103*b* disposed at another lateral end of the drawer frame 103 in the belt width direction. Conversely, the attachment 105*b* disposed at one lateral end of the sensor support 105 in the belt width direction is attached to the side plate 103*a* disposed at one lateral end of the drawer frame 103 in the belt width direction such that the attachment 105*b* is movable relative to the side plate 103*a*.

A description is provided of a construction of a comparative image forming apparatus.

The comparative image forming apparatus includes a belt unit including an intermediate transfer belt, a skew correction roller, a pivot plate, and a securing plate and a detector unit including a photosensor and a sensor support plate. The intermediate transfer belt serves as a belt. The skew correction roller serves as an opposed roller. The pivot plate serves as a roller support that rotatably supports one lateral end of the skew correction roller. The securing plate serves as a roller support that rotatably supports another lateral end of the skew correction roller. The photosensor serves as a detector. The sensor support plate serves as a detector support that supports the photosensor. The sensor support plate has one lateral end that is mounted on the pivot plate and another lateral end that is mounted on the securing plate.

As the pivot plate pivots in a pivot direction and one lateral end of the skew correction roller moves in the pivot direction of the pivot plate, the skew correction roller tilts and corrects skew of the intermediate transfer belt. As the pivot plate pivots, one lateral end of the sensor support plate moves in the pivot direction of the pivot plate. Accordingly, the sensor support plate tilts like the skew correction roller. Consequently, even if the skew correction roller tilts, the sensor support plate retains a posture of the photosensor with respect to the intermediate transfer belt.

However, the detector unit is attached to the securing plate of the belt unit and coupled with the belt unit. Hence, when an operator removes the belt unit from an apparatus body of the comparative image forming apparatus and installs the belt unit into the apparatus body, the operator unplugs a connector of the photosensor of the detector unit from a connector of the apparatus body and plugs the connector of the photosensor into the connector of the apparatus body. Thus, the operator may not perform removal and installation of the belt unit with respect to the apparatus body easily.

Figure 3:
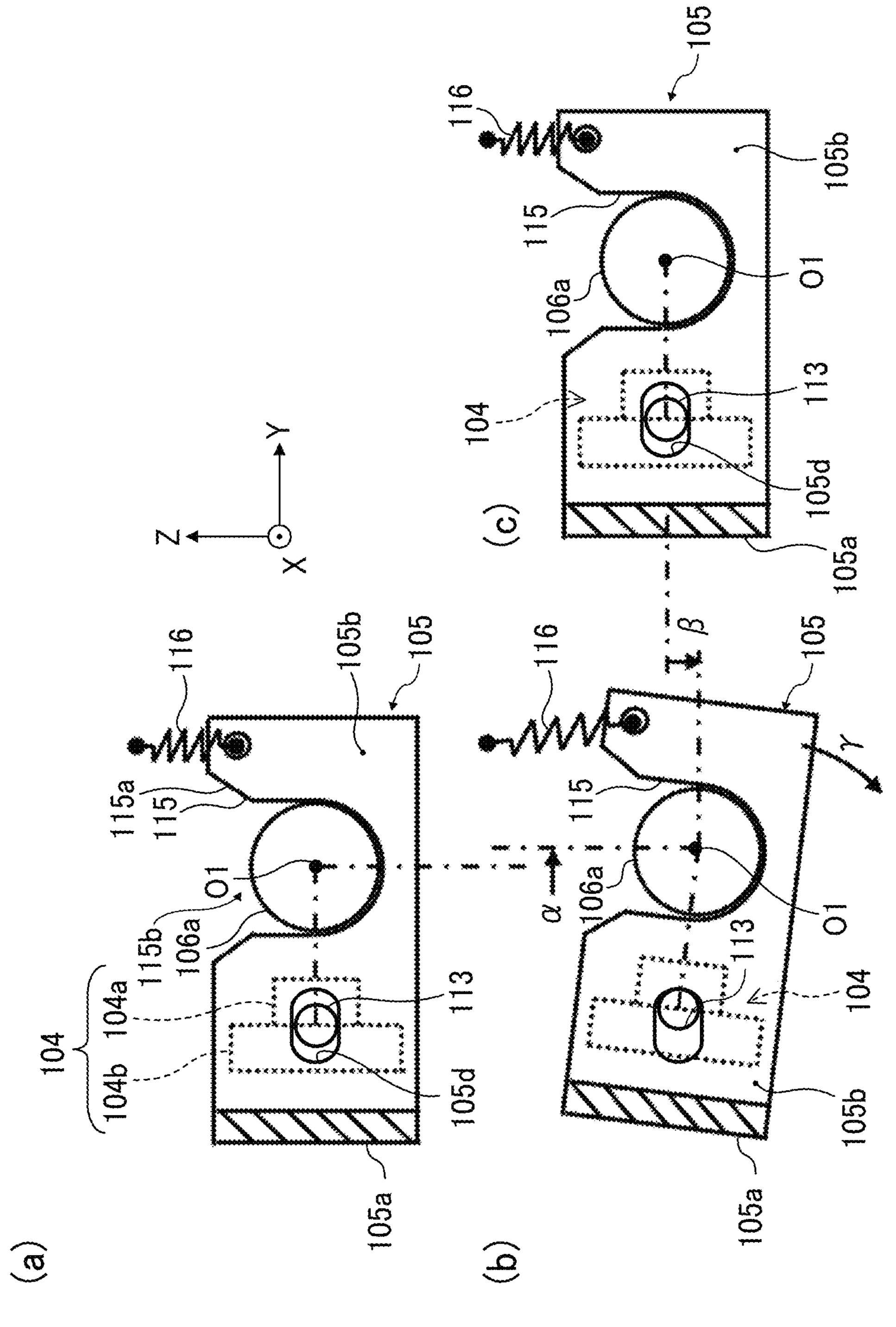
FIG. 3 is a diagram of a sensor support disposed opposite the secondary transfer device depicted in FIG. 2, illustrating an attachment disposed at one lateral end of the sensor support.

Referring to FIG. 3, a description is provided of a construction of the attachment 105*b* disposed at one lateral end of the sensor support 105 in the belt width direction.

FIG. 3 has sections (a), (b), and (c). The sections (a) and (c) illustrate the attachment 105*b* when the opposed roller 106 is not inclined. The section (b) illustrates the attachment 105*b* when the opposed roller 106 is inclined in Z-direction (e.g., the vertical direction) and Y-direction (e.g., a facing direction in which the adhesion amount detection sensor 104 is disposed opposite the secondary transfer belt 102).

The attachment 105*b* disposed at one lateral end of the sensor support 105 in the belt width direction includes a supported hole 105*d*, that is, a slot or an elongated hole elongated in Y-direction. As illustrated in FIG. 2, the printer 100 further includes a support projection 113 that projects from the side plate 103*a* disposed at one lateral end of the drawer frame 103 in the belt width direction. As illustrated in FIG. 3, the support projection 113 penetrates through the supported hole 105*d*. As illustrated in FIG. 2, the printer 100 further includes a spring 116 serving as a biasing member. The spring 116 has one end that is anchored to the side plate 103*a* disposed at one lateral end of the drawer frame 103 in the belt width direction. As illustrated in FIG. 3, the spring 116 has another end that is attached to a front end of the attachment 105*b* disposed at one lateral end of the sensor support 105 in the belt width direction. Accordingly, the support projection 113 and the spring 116 move the attachment 105*b* disposed at one lateral end of the sensor support 105 in the belt width direction relative to the side plate 103*a* disposed at one lateral end of the drawer frame 103 in the belt width direction in a predetermined range in Y-direction. The attachment 105*b* is attached to the drawer frame 103 through the support projection 113 and the spring 116 such that the attachment 105*b* pivots about X-axis relative to the drawer frame 103.

The sensor mount 105*a* of the sensor support 105 is an elongated plate that has a thickness in Y-direction and is elongated in X-direction. The sensor mount 105*a* deforms resiliently under torsion about X-axis. Since the sensor support 105 is shaped as described above, the sensor mount 105*a* also deforms resiliently about another lateral end of the sensor mount 105*a* in the belt width direction such that the sensor mount 105*a* tilts in Y-direction. The sensor mount 105*a* holds the adhesion amount detection sensor 104 that is mainly constructed of the sensor substrate 104*b* that is elongated in the belt width direction. The adhesion amount detection sensor 104 is mounted on the sensor mount 105*a* such that a thickness direction of the sensor substrate 104*b* is parallel to Y-direction. Hence, the adhesion amount detection sensor 104 also deforms resiliently under torsion about X-axis.

The attachment 105*b* disposed at one lateral end of the sensor support 105 in the belt width direction includes an engaging groove 115 disposed in the front end of the attachment 105*b*. The engaging groove 115 has a mouth 115*b* that is disposed at an upper portion of the engaging groove 115 in the vertical direction. One lateral end of the shaft 106*a* of the opposed roller 106, that penetrates through the roller support plate 109*a* and is exposed to an outside of the secondary transfer device 40, engages the engaging groove 115. The spring 116 biases the front end of the attachment 105*b* disposed at one lateral end of the sensor support 105 in the belt width direction upward in the vertical direction (e.g., +Z-direction). The spring 116 generates a biasing force that presses a lower portion of the engaging groove 115 against the shaft 106*a* of the opposed roller 106. The biasing force of the spring 116 is greater than a force that deforms the sensor mount 105*a* resiliently under torsion. Accordingly, if the shaft 106*a* disposed at one lateral end of the opposed roller 106 in the belt width direction is shifted upward in the vertical direction, the sensor mount 105*a* deforms resiliently under torsion about X-axis, fitting the engaging groove 115 to the shaft 106*a*.

Figure 4:
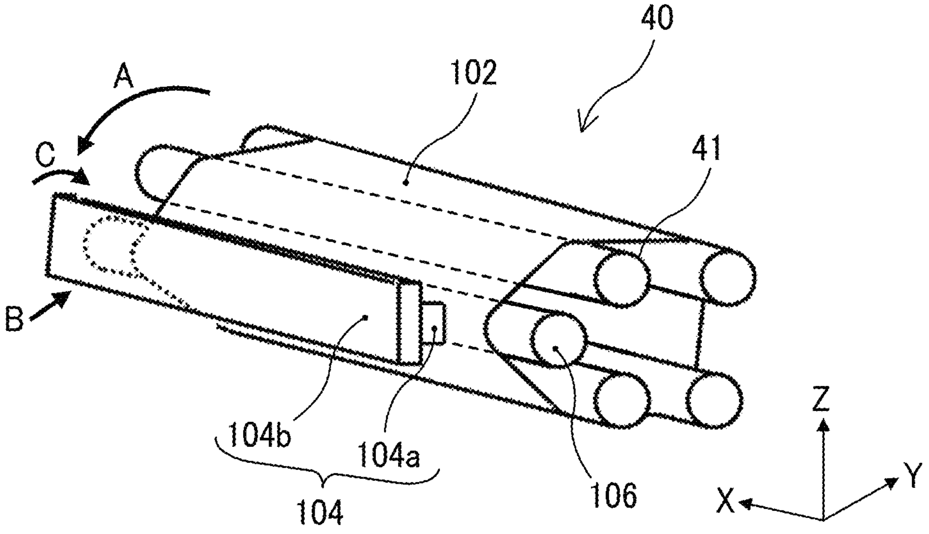
FIG. 4 is a perspective view of the secondary transfer device depicted in FIG. 2 and an adhesion amount detection sensor disposed opposite the secondary transfer device, illustrating a posture of the adhesion amount detection sensor when an opposed roller of the secondary transfer device tilts.

As illustrated in FIG. 4, one lateral end of the secondary transfer device 40 in the belt width direction, that is installed inside the apparatus body 100A, may be twisted in a direction A relative to another lateral end of the secondary transfer device 40 in the belt width direction by a manufacturing error or the like. In this case, the opposed roller 106 may tilt in Z-direction and Y-direction. If the opposed roller 106 tilts in Y-direction, a distance between the adhesion amount detection sensor 104 and the secondary transfer belt 102 may be uneven in X-direction (e.g., the belt width direction), degrading detection accuracy of the adhesion amount detection sensor 104. If the opposed roller 106 tilts in Z-direction, a posture of the adhesion amount detection sensor 104 with respect to the secondary transfer belt 102 may vary in X-direction. Accordingly, the light-emitting element of at least one of the detection portions 104*a* may emit light that does not travel to the rotation center O1 depicted in FIG. 3 of the opposed roller 106. Consequently, the light emitted from the light-emitting element of the at least one of the detection portions 104*a* onto an outer circumferential surface of the secondary transfer belt 102 may have an incident angle that is deviated from a target incident angle in a rotation direction of the secondary transfer belt 102. Thus, the adhesion amount detection sensor 104 may suffer from degradation in detection accuracy.

According to the embodiment, if the opposed roller 106 tilts in Y-direction and one lateral end of the opposed roller 106 in X-direction shifts from another lateral end of the opposed roller 106 in X-direction by a length $\alpha$ in a unit of mm in Y-direction as illustrated in the section (b) of FIG. 3, the sensor support 105 tilts in accordance with a tilt of the opposed roller 106 as described below. For example, the engaging groove 115 of the attachment 105*b* disposed at one lateral end of the sensor support 105 in X-direction engages the shaft 106*a* of the opposed roller 106. Hence, the engaging groove 115 is subject to shifting by the length $\alpha$ in the unit of mm in Y-direction together with the shaft 106*a*. The attachment 105*b* disposed at one lateral end of the sensor support 105 in X-direction is movable in Y-direction relative to the side plate 103*a* disposed at one lateral end of the drawer frame 103 in X-direction. Accordingly, the engaging groove 115 moves in Y-direction by the length α in the unit of mm in accordance with motion of one lateral end of the opposed roller 106 in X-direction. The sensor support 105 deforms resiliently about another lateral end of the sensor mount 105*a* as a reference point. The sensor mount 105*a* tilts in Y-direction in accordance with motion of the opposed roller 106. Accordingly, one lateral end of the adhesion amount detection sensor 104 in the belt width direction that is mounted on the sensor mount 105*a* shifts with respect to another lateral end of the adhesion amount detection sensor 104 in the belt width direction by the length α in the unit of mm in a direction B depicted in FIG. 4. Consequently, the adhesion amount detection sensor 104 tilts in accordance with motion of the opposed roller 106, thus retaining a constant distance between each of the detection portions 104*a* and the secondary transfer belt 102.

If the opposed roller 106 tilts in Z-direction and one lateral end of the opposed roller 106 in X-direction shifts from another lateral end of the opposed roller 106 in X-direction by a length β in a unit of mm in Z-direction as illustrated in the section (b) of FIG. 3, the adhesion amount detection sensor 104 twists about X-axis in a direction C depicted in FIG. 4 together with the sensor support 105 as described below. For example, as the engaging groove 115 that engages the shaft 106*a* of the opposed roller 106 shifts by the length β in the unit of mm in Z-direction, the attachment 105*b* disposed at one lateral end of the sensor support 105 in X-direction pivots about the support projection 113 as a fulcrum in γ-direction depicted in the section (b) of FIG. 3. The sensor substrate 104*b* of the adhesion amount detection sensor 104 deforms resiliently under torsion about X-axis together with the sensor mount 105*a*. Accordingly, the sensor substrate 104*b* suppresses change of a posture of each of the detection portions 104*a* of the adhesion amount detection sensor 104 with respect to the secondary transfer belt 102. Consequently, the sensor substrate 104*b* prevents the light emitted from the light-emitting element of each of the detection portions 104*a* from travelling to a position deviating from the rotation center O1 of the opposed roller 106 and prevents the incident angle at which the light emitted from the light-emitting element of each of the detection portions 104*a* travels onto the outer circumferential surface of the secondary transfer belt 102 from deviating from the target incident angle.

As described above, according to the embodiment, even if the opposed roller 106 tilts in Y-direction and Z-direction due to the manufacturing error or the like, the adhesion amount detection sensor 104 retains detection accuracy.

According to the embodiment, as illustrated in FIG. 2, the sensor unit 110 is mounted on the drawer frame 103 of the apparatus body 100A. As illustrated in FIG. 3, the engaging groove 115 has the mouth 115*b* that is disposed at the upper portion of the engaging groove 115 in the vertical direction. As one end of the shaft 106*a* of the opposed roller 106 moves in the vertical direction (e.g., +Z-direction), the engaging groove 115 disengages the shaft 106*a*. Accordingly, the operator removes and installs the secondary transfer device 40 with respect to the apparatus body 100A while the sensor unit 110 remains inside the apparatus body 100A and is mounted on the drawer frame 103.

For example, in order to remove the secondary transfer device 40 from the apparatus body 100A, the operator draws the drawer frame 103 from the apparatus body 100A. Subsequently, the operator slides the positioner 107 disposed opposite another lateral end of the secondary transfer device 40 in the belt width direction, releasing positioning and supporting of the shaft 106*a* of the opposed roller 106 by the positioner 107. Thus, no element restricts upward motion of the secondary transfer device 40 in the vertical direction. Hence, as the operator moves the secondary transfer device 40 upward in the vertical direction, the operator removes the secondary transfer device 40 from the apparatus body 100A in a state in which the sensor unit 110 is left inside the apparatus body 100A.

If the sensor unit 110 is secured to the secondary transfer device 40, when the operator removes the secondary transfer device 40 from the apparatus body 100A or detaches the secondary transfer device 40 from the drawer frame 103, the operator unplugs the connector that electrically connects the adhesion amount detection sensor 104 with the apparatus body 100A. Thus, the operator may suffer from a disadvantage of degradation in removal and installation of the secondary transfer device 40 with respect to the apparatus body 100A. Additionally, the sensor unit 110 secured to the secondary transfer device 40 may cause a disadvantage of increased costs for manufacturing, replacement, and maintenance of the secondary transfer device 40. Further, in order to reuse the secondary transfer device 40, the operator may suffer from a disadvantage of an additional process for detaching the sensor unit 110 from the secondary transfer device 40.

To address the disadvantages described above, according to the embodiment, the operator removes the secondary transfer device 40 from the apparatus body 100A or detaches the secondary transfer device 40 from the drawer frame 103 while the sensor unit 110 is left inside the apparatus body 100A. Accordingly, in order to remove the secondary transfer device 40 from the apparatus body 100A, the operator does not unplug the connector that electrically connects the adhesion amount detection sensor 104 with the apparatus body 100A. Thus, the operator removes the secondary transfer device 40 from the apparatus body 100A readily. Additionally, after the operator installs the secondary transfer device 40 into the apparatus body 100A, the operator does not connect the connector of the adhesion amount detection sensor 104 with the connector of the apparatus body 100A. Thus, the operator installs the secondary transfer device 40 with improved efficiency.

Compared to a configuration in which the sensor unit 110 is secured to the secondary transfer device 40, the secondary transfer device 40 that is separable from the sensor unit 110 reduces costs. For example, the secondary transfer device 40 is replaced at reduced costs, resulting in reduced maintenance costs. The secondary transfer device 40 is reused with reduced processes.

According to the embodiment, the engaging groove 115 has the mouth 115*b* that is disposed at the upper portion of the engaging groove 115 in the vertical direction. Hence, when the operator removes the secondary transfer device 40 from the apparatus body 100A, the operator does not disengage the opposed roller 106 from the engaging groove 115. Thus, the operator removes the secondary transfer device 40 from the apparatus body 100A readily.

Figure 5:
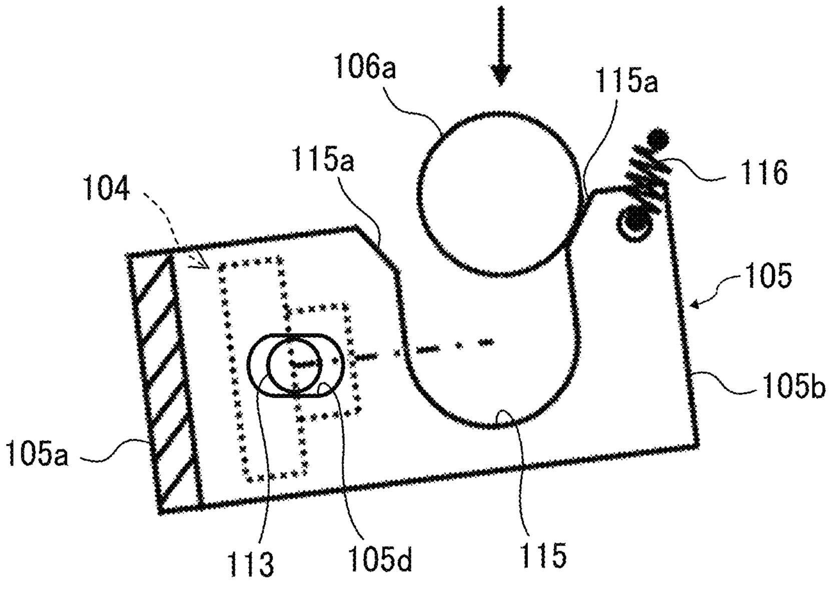
FIG. 5 is a diagram of the sensor support depicted in FIG. 3 and the opposed roller depicted in FIG. 4, illustrating a shaft of the opposed roller to be inserted into an engaging groove of the sensor support.

According to the embodiment, as illustrated in the section (a) of FIG. 3, the engaging groove 115 further includes taper portions 115*a* serving as guides. The taper portions 115*a* abut on the mouth 115*b* and widen the mouth 115*b* gradually upward in the vertical direction. Hence, as illustrated in FIG. 5, when the operator attaches the secondary transfer device 40 to the drawer frame 103 of the apparatus body 100A, the taper portions 115*a* guide the shaft 106*a* of the opposed roller 106 to the engaging groove 115. Accordingly, the shaft 106*a* of the opposed roller 106 engages the engaging groove

115 readily. Thus, the operator installs the secondary transfer device 40 into the apparatus body 100A readily.

As illustrated in FIG. 2, according to the embodiment, the attachment 105*c* disposed at another lateral end of the sensor support 105 of the sensor unit 110 in X-direction is secured to the side plate 103*b* disposed at another lateral end of the drawer frame 103 in X-direction. The side plate 103*b* positions another lateral end of the opposed roller 106 in X-direction (e.g., the belt width direction) in Y-direction and Z-direction. Accordingly, the attachment 105*c* positions another lateral end of the adhesion amount detection sensor 104 in X-direction with respect to the secondary transfer belt 102 at a target position precisely.

Figure 6A:
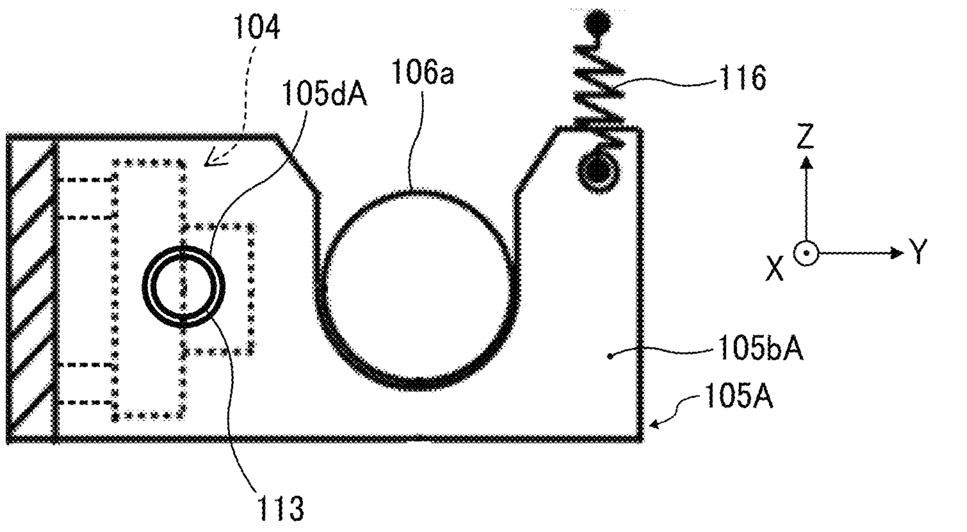
FIG. 6A is a diagram of an attachment as one variation of the attachment depicted in FIG. 3.

As illustrated in FIG. 2, the positioner 108 disposed opposite one lateral end of the secondary transfer device 40 in X-direction positions one lateral end of the opposed roller 106 in X-direction (e.g., the belt width direction) in Y-direction. Accordingly, the opposed roller 106 tilts in Y-direction in a decreased amount. Hence, the decreased amount of a tilt of the opposed roller 106 in Y-direction may be neglectable according to a target detection accuracy. In this case, as illustrated in FIG. 6A, a sensor support 105A including an attachment 105*b*A having a supported hole 105*d*A may be employed. The supported hole 105*d*A is a round hole through which the support projection 113 penetrates. The attachment 105*b*A disposed at one lateral end of the sensor support 105A in X-direction pivots about X-axis relative to the drawer frame 103.

Figure 6B:
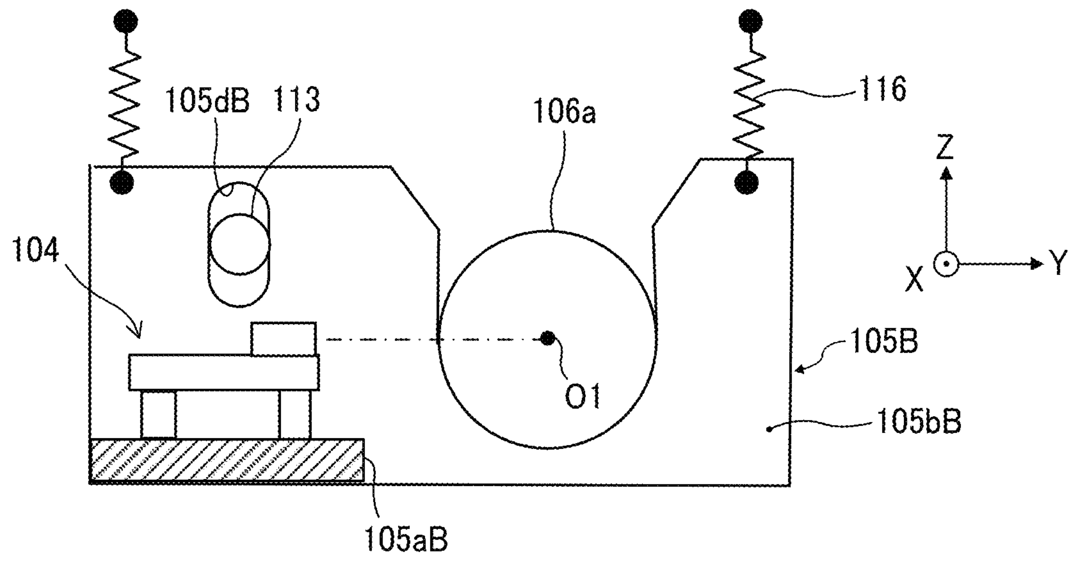
FIG. 6B is a diagram of an attachment as another variation of the attachment depicted in FIG. 3.

As illustrated in FIG. 6B, a sensor support 105B including a sensor mount 105*a*B and an attachment 105*b*B may be employed. The sensor mount 105*a*B is a plate that is perpendicular to Z-direction (e.g., the vertical direction). The attachment 105*b*B includes a supported hole 105*d*B that is an elongated hole elongated in the vertical direction. The attachment 105*b*B disposed at one lateral end of the sensor support 105B in X-direction moves in the vertical direction relative to the side plate 103*a*. Accordingly, when the opposed roller 106 tilts in Z-direction, the sensor support 105B deforms resiliently about another lateral end of the sensor mount 105*a*B in X-direction (e.g., the belt width direction). The sensor mount 105*a*B tilts in Z-direction in accordance with motion of the opposed roller 106. Accordingly, even if the opposed roller 106 tilts in Z-direction, the attachment 105*b*B causes light emitted from the light-emitting element of each of the detection portions 104*a* to travel to the rotation center O1 of the opposed roller 106, preventing the incident angle at which the light emitted from the light-emitting element of each of the detection portions 104*a* travels onto the outer circumferential surface of the secondary transfer belt 102 from deviating from the target incident angle.

If another lateral end of the opposed roller 106 in X-direction is not positioned, the attachment 105*c* disposed at another lateral end of the sensor support 105 may preferably employ a construction similar to the construction of the attachment 105*b* disposed at one lateral end of the sensor support 105 in X-direction illustrated in FIG. 3.

According to the embodiment, the adhesion amount detection sensor 104 is disposed opposite the secondary transfer belt 102. Alternatively, the adhesion amount detection sensor 104 may be disposed opposite the intermediate transfer belt 31. The sensor support 105 of the sensor unit 110, that supports the adhesion amount detection sensor 104 disposed opposite the intermediate transfer belt 31, is configured as described above. Thus, the adhesion amount detection sensor 104 detects the toner adhesion amount of toner of the detection pattern on the intermediate transfer belt 31 precisely. Additionally, the operator removes the transfer unit 30 serving as the intermediate transfer device from the apparatus body 100A while the sensor unit 110 is left inside the apparatus body 100A.

The detector incorporated in the sensor unit 110 may be a surface detection sensor that detects a condition of a surface of a belt or a temperature sensor that detects a temperature of the surface of the belt as a condition of the surface of the belt. Hence, for example, the technology of the present disclosure may be applied to a temperature detector unit that detects a temperature of the fixing belt 94. As the temperature detector unit that detects the temperature of the fixing belt 94 is applied with the technology of the present disclosure, the temperature detector unit detects the temperature of the fixing belt 94 in a belt width direction thereof precisely. Additionally, in a state in which the temperature detector unit is left inside the fixing device 90, the operator removes a fixing belt unit incorporating the fixing belt 94 from the fixing device 90 and installs the fixing belt unit into the fixing device 90.

The embodiments described above are examples and achieve advantages peculiar to aspects below, respectively.

A description is provided of a first aspect of the technology of the present disclosure.

As illustrated in FIGS. 1, 2, and 3, an image forming apparatus (e.g., the printer 100) includes an apparatus body (e.g., the drawer frame 103 of the apparatus body 100A), a belt unit (e.g., the secondary transfer device 40), and a detector unit (e.g., the sensor unit 110). The belt unit includes a plurality of tension rollers, for example, a first tension roller (e.g., the opposed roller 106) and a second tension roller (e.g., the secondary transfer roller 41), a belt (e.g., the secondary transfer belt 102), and a roller support (e.g., the roller support plates 109*a* and 109*b*). The detector unit includes a detector (e.g., the adhesion amount detection sensor 104) and a detector support (e.g., the sensor supports 105, 105A, and 105B).

The first tension roller and the second tension roller, that rotate, stretch and support the belt. Thus, the belt is stretched across the first tension roller and the second tension roller. The roller support rotatably supports the first tension roller and the second tension roller. The detector is disposed opposite the first tension roller (e.g., the opposed roller 106) as one of the plurality of tension rollers via the belt. The detector detects a condition of a belt surface of the belt or a condition of a detection object (e.g., a toner adhesion amount of toner of a detection pattern) on the belt surface of the belt. The detector support supports the detector. The first tension roller includes a shaft (e.g., the shaft 106*a*) that is disposed at one lateral end of the first tension roller in an axial direction thereof, that is parallel to a belt width direction of the belt.

The belt unit is attachably detached from the apparatus body in a detaching direction, that is, an orthogonal direction perpendicular to the belt width direction of the belt. For example, the belt unit is attached in an attaching direction as the orthogonal direction and detached in the detaching direction as the orthogonal direction with respect to the apparatus body. The detector support of the detector unit includes both lateral ends in the belt width direction, that are attached to the apparatus body. For example, the detector support includes a first lateral end portion (e.g., the attachments 105*b*, 105*b*A, and 105*b*B) that is disposed at one lateral end of the detector support in the axial direction of the first tension roller, that is parallel to the belt width direction of the belt, and attached to the apparatus body (e.g., the drawer frame 103). The detector support further includes a second lateral end portion (e.g., the attachment 105*c*) that is disposed at another lateral end of the detector support in the axial direction of the first tension roller, that is parallel to the belt width direction of the belt, and attached to the apparatus body (e.g., the drawer frame 103). The first lateral end portion is attached to the apparatus body (e.g., the drawer frame 103) such that the first lateral end portion is movable with respect to the apparatus body. At least the first lateral end portion of the detector support includes an engaging groove (e.g., the engaging groove 115) that engages the shaft of the first tension roller. The shaft penetrates through the roller support. The engaging groove has a mouth (e.g., the mouth 115*b*) that is disposed at a downstream end of the engaging groove in the detaching direction (e.g., Z-direction) in which the belt unit is detached from the apparatus body.

According to the first aspect, the image forming apparatus has a configuration described below. Hence, even if the first tension roller (e.g., the opposed roller 106) tilts, the first lateral end portion of the detector support prevents a posture of the detector from shifting with respect to the belt. For example, at least the first lateral end portion of the detector support in the belt width direction includes the engaging groove that engages the shaft disposed at one lateral end of the first tension roller in the belt width direction. At least the first lateral end portion of the detector support in the belt width direction is attached to the apparatus body such that the first lateral end portion is movable relative to the apparatus body. Since the first lateral end portion is movably attached to the apparatus body, when the first tension roller tilts and the shaft of the first tension roller, that is disposed at one lateral end of the first tension roller in the belt width direction, shifts from a shaft of the first tension roller, that is disposed at another lateral end of the first tension roller in the belt width direction, the engaging groove that engages the shaft of the first tension roller moves in a shift direction in which the shaft shifts. Accordingly, the detector support tilts similarly to the first tension roller, retaining the posture of the detector with respect to the belt. Thus, the detector support prevents a distance from the detector to the belt surface of the belt from varying between positions on the belt surface, that are arranged in the belt width direction. The detector support also prevents an incident angle at which light emitted from the detector travels onto the belt surface of the belt from varying between the positions on the belt surface, that are arranged in the belt width direction. Accordingly, the detector detects the condition of the belt surface of the belt or the condition of the detection object such as the detection pattern on the belt surface of the belt properly.

According to the first aspect, the detector unit is attached to the apparatus body. The engaging groove has the mouth that is disposed at the downstream end of the engaging groove in the detaching direction in which the belt unit is detached from the apparatus body. Hence, as the operator detaches the belt unit in the detaching direction in which the belt unit is detached from the apparatus body, the engaging groove disengages the shaft disposed at one lateral end of the first tension roller in the belt width direction. Thus, the operator detaches the belt unit from the apparatus body in a state in which the detector unit is left inside the apparatus body. Accordingly, when the operator performs attachment and detachment of the belt unit with respect to the apparatus body, the operator does not disconnect and connect a connector of the detector of the detector unit with respect to a connector of the apparatus body. Thus, the operator performs attachment and detachment of the belt unit with respect to the apparatus body readily.

A description is provided of a second aspect of the technology of the present disclosure.

According to the second aspect based on the first aspect, at least the first lateral end portion of the detector support (e.g., the sensor support 105) in the belt width direction moves in a facing direction in which the detector (e.g., the adhesion amount detection sensor 104) is disposed opposite the first tension roller (e.g., the opposed roller 106). The first lateral end portion of the detector support is attached to the apparatus body such that the first lateral end portion is pivotable about an axis that is parallel to the belt width direction. The detector support further includes a detector mount (e.g., the sensor mounts 105*a* and 105*a*B) that is elongated in the belt width direction and mounts the detector (e.g., the adhesion amount detection sensor 104). The detector mount is deformable resiliently under torsion about the axis that is parallel to the belt width direction.

Accordingly, as described above, if the first tension roller tilts in the facing direction (e.g., Y-direction), the first lateral end portion of the detector support (e.g., the sensor support 105) moves in the facing direction according to a shift amount of a shift in the facing direction of one lateral end of the first tension roller in the belt width direction with respect to another lateral end of the first tension roller in the belt width direction. Accordingly, the detector support tilts in the facing direction in accordance with the shift of the first tension roller, preventing a distance from the detector to the belt from varying between positions arranged on the belt in the belt width direction.

If the first tension roller tilts in an orthogonal direction (e.g., Z-direction) perpendicular to the facing direction (e.g., Y-direction) and the belt width direction (e.g., X-direction), the detector mount (e.g., the sensor mount 105*a*) of the detector support deforms resiliently under torsion about the axis that is parallel to the belt width direction. The detector supported by the detector support includes a plurality of detection portions (e.g., the detection portions 104*a*) arranged in the belt width direction. Each of the detection portions has an opposed face that is disposed opposite the belt surface of the belt. The detector retains a posture with which a line extending perpendicularly from a center of the opposed face passes through a rotation center (e.g., the rotation center O1) of the first tension roller. Accordingly, the detector support prevents the incident angle at which light emitted from the detector travels onto the belt surface from deviating from a target incident angle. Consequently, the detector detects the condition of the belt surface of the belt or the condition of the detection object (e.g., the toner adhesion amount of toner of the detection pattern) on the belt surface of the belt properly.

Accordingly, even if the first tension roller tilts in any manner, the detector detects the condition of the belt surface of the belt or the condition of the detection object (e.g., the toner adhesion amount of toner of the detection pattern) on the belt surface of the belt precisely.

A description is provided of a third aspect of the technology of the present disclosure.

According to the third aspect based on the first aspect or the second aspect, the image forming apparatus further includes a biasing member (e.g., the spring 116) that biases the engaging groove (e.g., the engaging groove 115) in the detaching direction of the belt unit.

Accordingly, as described above in the embodiment, even if one lateral end of the first tension roller (e.g., the opposed roller 106) in the belt width direction shifts with respect to another lateral end of the first tension roller in the belt width direction in the detaching direction in which the belt unit (e.g., the secondary transfer device 40) is detached from the apparatus body, the biasing member (e.g., the spring 116) generates a biasing force that moves the engaging groove in a shift direction in which one lateral end of the first tension roller in the belt width direction shifts. Accordingly, the biasing member prevents the shaft of the first tension roller from falling off the engaging groove. Additionally, the biasing member adjusts the posture of the detector according to a tilt of the first tension roller in the detaching direction of the belt unit. Thus, the detector detects the condition of the belt surface of the belt or the condition of the detection object (e.g., the toner adhesion amount of toner of the detection pattern) on the belt surface of the belt properly.

A description is provided of a fourth aspect of the technology of the present disclosure.

According to the fourth aspect based on any one of the first aspect to the third aspect, the first tension roller further includes another shaft (e.g., the shaft 106*a*) that is disposed at another lateral end of the first tension roller in the belt width direction. The another shaft penetrates through the roller support (e.g., the roller support plate 109*b*). The image forming apparatus further includes a positioner (e.g., the positioner 107) that is mounted on the apparatus body. The positioner positions the another shaft with respect to the apparatus body in the facing direction (e.g., Y-direction) in which the detector is disposed opposite the first tension roller and the detaching direction (e.g., Z-direction) of the belt unit. The second lateral end portion of the detector support in the belt width direction is secured to the apparatus body. For example, the image forming apparatus further includes a fastener (e.g., the screw 120) that fastens the second lateral end portion to the apparatus body.

Accordingly, as described in the embodiment, the another shaft disposed at another lateral end of the first tension roller in the belt width direction is positioned in the facing direction (e.g., Y-direction) and the detaching direction (e.g., Z-direction). Hence, the another shaft does not shift in the facing direction (e.g., Y-direction) and the detaching direction (e.g., Z-direction). Accordingly, as the second lateral end portion of the detector support in the belt width direction is secured to the apparatus body, the detection portion (e.g., the detection portion 104*a*) disposed at another lateral end of the detector in the belt width direction retains a target distance between the detection portion and the belt surface of the belt and retains a target posture with respect to the belt.

A description is provided of a fifth aspect of the technology of the present disclosure.

According to the fifth aspect based on any one of the first aspect to the fourth aspect, the detector support (e.g., the sensor support 105) further includes a guide (e.g., the taper portion 115*a*) that guides the shaft of the first tension roller to the engaging groove.

Accordingly, as described in the embodiment, the guide causes the shaft of the first tension roller to engage the engaging groove readily, facilitating attachment of the belt unit (e.g., the secondary transfer device 40) to the apparatus body.

A description is provided of a sixth aspect of the technology of the present disclosure.

According to the sixth aspect based on any one of the first aspect to the fifth aspect, the belt is an image bearing belt that bears a toner image. The detector detects the toner image on the image bearing belt.

Accordingly, as described in the embodiment, the detector detects the toner image precisely.

A description is provided of a seventh aspect of the technology of the present disclosure.

According to the seventh aspect based on the sixth aspect, the image bearing belt is an intermediate transfer belt (e.g., the intermediate transfer belt 31) onto which the toner image formed on an image bearer (e.g., the photoconductors 2Y, 2M, 2C, and 2K) is transferred intermediately.

Accordingly, the detector detects the toner image on the intermediate transfer belt precisely.

A description is provided of an eighth aspect of the technology of the present disclosure.

According to the eighth aspect based on the sixth aspect, the image bearing belt is a secondary transfer belt (e.g., the secondary transfer belt 102). The secondary transfer belt is disposed opposite a primary transfer belt (e.g., the intermediate transfer belt 31) onto which the toner image on the image bearer is transferred.

Accordingly, the detector detects the toner image as the detection pattern borne on the secondary transfer belt precisely.

According to the embodiments described above, the printer 100 serves as an image forming apparatus. Alternatively, the image forming apparatus may be a copier, a facsimile machine, a multifunction peripheral (MFP) having at least two of copying, printing, scanning, facsimile, and plotter functions, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:

an apparatus body;

a belt unit to be attachably detached from the apparatus body in a detaching direction, the belt unit including:

a first tension roller to rotate, the first tension roller including a shaft disposed at one lateral end of the first tension roller in an axial direction of the first tension roller, the axial direction perpendicular to the detaching direction of the belt unit;

a second tension roller to rotate; and a belt stretched across the first tension roller and the second tension roller; and a detector unit including:

a detector disposed opposite the first tension roller via the belt, the detector to detect one of a condition of a belt surface of the belt and a condition of a detection object on the belt surface of the belt; and a detector support supporting the detector, the detector support including:

a first lateral end portion disposed at one lateral end of the detector support in the axial direction of the first tension roller and movably attached to the apparatus body; and a second lateral end portion disposed at another lateral end of the detector support in the axial direction of the first tension roller and attached to the apparatus body, the first lateral end portion including an engaging groove to engage the shaft of the first tension roller, the engaging groove having a mouth disposed at a downstream end of the engaging groove in the detaching direction of the belt unit, the image forming apparatus further comprising a projection projecting from the apparatus body, wherein the first lateral end portion of the detector support has a hole through which the projection penetrates, and wherein the first lateral end portion of the detector support pivots about the projection.

2. The image forming apparatus according to claim 1, wherein the belt unit further includes a roller support that rotatably supports the first tension roller and the second tension roller, the roller support through which the shaft of the first tension roller penetrates.

3. The image forming apparatus according to claim 1, wherein the first lateral end portion of the detector support moves in a facing direction in which the detector is disposed opposite the first tension roller, and wherein the first lateral end portion of the detector support pivots about an axis that is parallel to the axial direction of the first tension roller.

4. The image forming apparatus according to claim 3, wherein the detector support further includes a detector mount elongated in the axial direction of the first tension roller, the detector mount mounting the detector.

5. The image forming apparatus according to claim 4, wherein the detector mount deforms resiliently under torsion about the axis that is parallel to the axial direction of the first tension roller.

6. The image forming apparatus according to claim 1, wherein the hole includes a slot elongated in an orthogonal direction perpendicular to the axial direction of the first tension roller.

7. The image forming apparatus according to claim 6, wherein the detector mount includes a plate that is perpendicular to the orthogonal direction.

8. The image forming apparatus according to claim 1, wherein the hole includes a round hole.

9. The image forming apparatus according to claim 1, further comprising a biasing member to bias the engaging groove in the detaching direction of the belt unit.

10. The image forming apparatus according to claim 1, further comprising a positioner mounted on the apparatus body, wherein the first tension roller further includes another shaft disposed at another lateral end of the first tension roller in the axial direction of the first tension roller, and wherein the positioner positions said another shaft with respect to the apparatus body in a facing direction in which the detector is disposed opposite the first tension roller and the detaching direction of the belt unit.

11. The image forming apparatus according to claim 10, further comprising a fastener to fasten the second lateral end portion of the detector support to the apparatus body.

12. The image forming apparatus according to claim 1, wherein the detector support further includes a guide to guide the shaft of the first tension roller to the engaging groove.

13. The image forming apparatus according to claim 1, wherein the belt bears a toner image, and wherein the detector detects the toner image on the belt.

14. The image forming apparatus according to claim 13, further comprising an image bearer to bear the toner image.

15. The image forming apparatus according to claim 14, wherein the belt includes an intermediate transfer belt onto which the toner image on the image bearer is transferred intermediately.

16. The image forming apparatus according to claim 14, further comprising a primary transfer belt onto which the toner image on the image bearer is transferred, wherein the belt of the belt unit includes a secondary transfer belt disposed opposite the primary transfer belt.

17. The image forming apparatus according to claim 1, wherein each of the first lateral end portion and the second lateral end portion of the detector support includes an attachment.

18. The image forming apparatus according to claim 1, wherein the apparatus body includes a drawer frame.

19. An image forming apparatus comprising:

an apparatus body;

a belt unit to be attachably detached from the apparatus body in a detaching direction, the belt unit including:

a first tension roller to rotate, the first tension roller including a shaft disposed at one lateral end of the first tension roller in an axial direction of the first tension roller, the axial direction perpendicular to the detaching direction of the belt unit;

a second tension roller to rotate; and a belt stretched across the first tension roller and the second tension roller; and a detector unit including:

means for detecting, disposed opposite the first tension roller via the belt, one of a condition of a belt surface of the belt and a condition of a detection object on the belt surface of the belt; and a detector support supporting the means for detecting, the detector support including:

a first lateral end portion disposed at one lateral end of the detector support in the axial direction of the first tension roller and movably attached to the apparatus body; and a second lateral end portion disposed at another lateral end of the detector support in the axial direction of the first tension roller and attached to the apparatus body, the first lateral end portion including an engaging groove to engage the shaft of the first tension roller, the engaging groove having a mouth disposed at a downstream end of the engaging groove in the detaching direction of the belt unit, the image forming apparatus further comprising a projection projecting from the apparatus body, wherein the first lateral end portion of the detector support has a hole through which the projection penetrates, and wherein the first lateral end portion of the detector support pivots about the projection.

20. The image forming apparatus according to claim 19, wherein the belt unit further includes a roller support that rotatably supports the first tension roller and the second tension roller, the roller support through which the shaft of the first tension roller penetrates.

* * * * *